No. 793,240. PATENTED JUNE 27, 1905.
G. SPALDING.
ROTARY DISK PLOW.
APPLICATION FILED SEPT. 28, 1903.
2 SHEETS—SHEET 2.
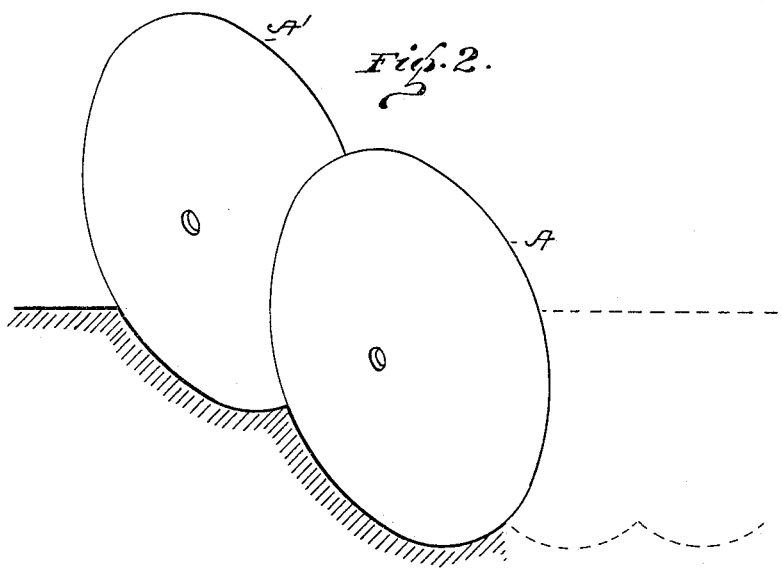
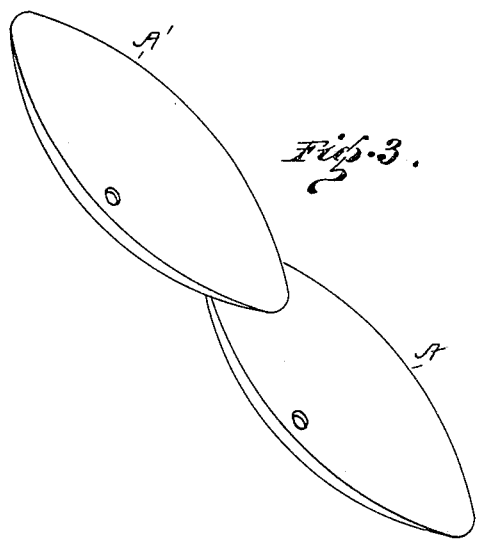
Witnesses
Inventor
George Spalding.
by Baldwin Vale
Attorney No. 793,240.                                              Patented June 27, 1905.

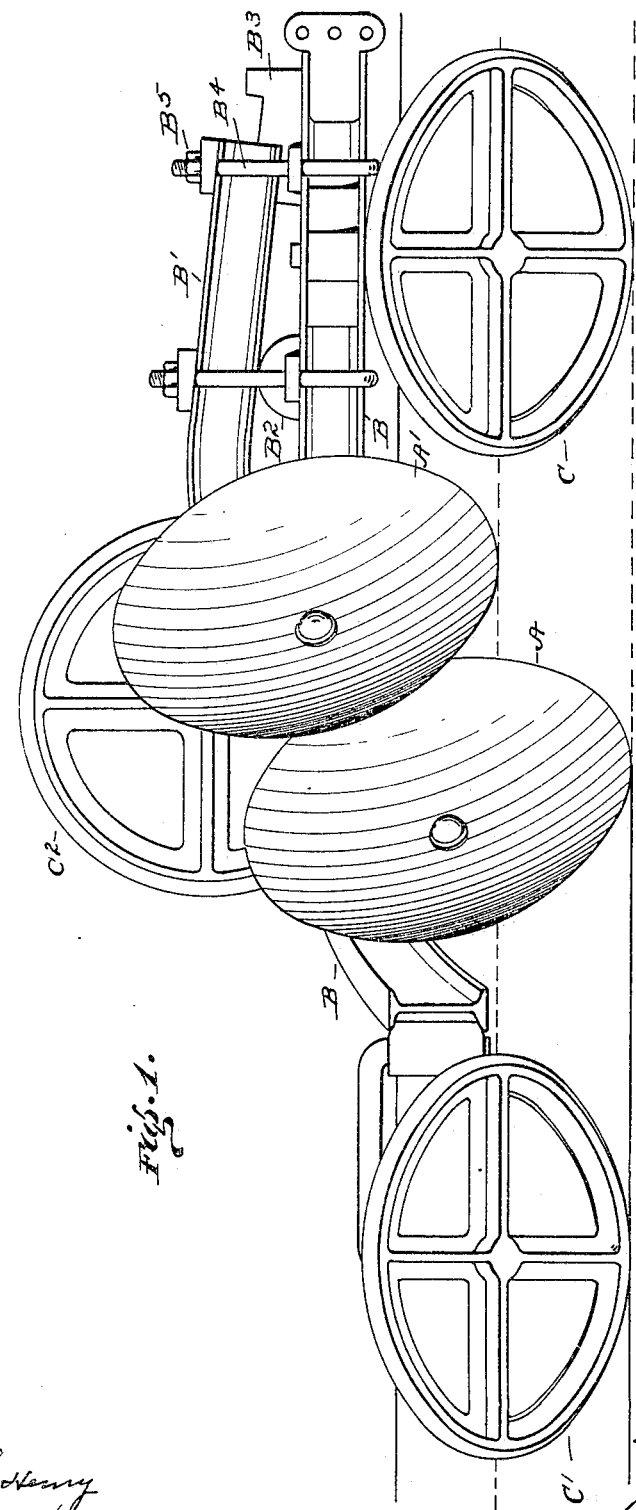

UNITED STATES PATENT OFFICE.

GEORGE SPALDING, OF SAN FRANCISCO, CALIFORNIA.

ROTARY DISK PLOW.

SPECIFICATION forming part of Letters Patent No. 793,240, dated June 27, 1905.

Application filed September 28, 1903. Serial No. 174,993.

*To all whom it may concern:*

Be it known that I, GEORGE SPALDING, a citizen of the United States, post-office address 217 Crocker Building, in the city of San Francisco, county of San Francisco, and State of California, have invented certain new and useful Improvements in Rotary Disk Plows; and I do hereby declare the following to be a full, clear, and exact description of the said invention, such as will enable others skilled in the art to which it most nearly appertains to make, use, and practice the same.

This invention relates to improvements in plows, and more particularly to rotary disk plows.

The object accomplished is the cutting of a deep furrow without increasing the diameter of the cutting-disk beyond the proven practical working diameter.

In rotary disk plows the maximum practical working diameter of disks has been found to be approximately twenty-four inches. Approximately one-third the diameter of the disk is capable of cutting and turning a furrow economically. The forward edge of the disk from the ground-level to the vertical center of the disk below ground is the cutting edge, which shears off the soil and passes it onto the remaining surface of the submerged disk, up which it is carried by the rotation until the curvature of the disk turns it completely over and spills it into the open furrow of the former cut. The furrow depth to which a twenty-four-inch disk can cut is about eight inches. This depth suffices in all ordinary cases. In sugar-beet culture, for instance, it is necessary to plow to a depth of from twelve to sixteen inches, which would require a disk forty-eight inches in diameter, with a proportionate convexity, which from a structural and operative standpoint is impractical.

In accomplishing the above object the invention broadly consists of two disks to cut one furrow, one disk being set forward and above the other and laterally offset thereto with respect to the convexity of the disks. Common to all disk plows this construction requires a suitable frame mounted upon wheels to counteract the thrust of the disks. This structure being old, no claim of novelty is made therefor. The number of disks may be increased, and they may be set at various angles to each other, vertically and laterally, and the proportionate depth of cut of each disk may be varied to suit circumstances or they may be reversed to throw the furrow to the left instead of to the right, as illustrated, and the particular type of mounting may be varied without interfering with the spirit of this invention.

In the drawings, Figure 1 is a side elevation at right angles to the line of draft of a plow constructed in accordance with this invention. Fig. 2 is a diagrammatic rear elevation looking in the direct line of draft of two disks set in the ground in the preferred relation to each other, and Fig. 3 is a plan view from above of the same.

Because of the peculiar angles, curvatures, &c., in the relation of the parts of a disk plow the line of draft becomes the most feasible base from which to calculate. The line of draft is a line through the balance center of the lateral resistance parallel with the forward direction of the plow movement. In detail the construction consists of the disk A, suitably journaled to the I-beam B, which is the "backbone" of the plow, the forward and rear furrow-wheels C and C' being attached thereto. One or both of these wheels may be pivoted to facilitate turning corners or be provided with a tiller to aid in steering the plow. The disk A determines the depth of the furrow. This may be regulated by raising or lowering the furrow-wheel C and the land-wheel $C^2$. The disk A' is suitably journaled in the short beam B', which is fulcrumed in the block $B^2$, rigidly secured to the beam B. The elevation of the forward end of the beam B' is determined by the graduated block or wedge $B^3$, jammed between the beams B and B' by the yoke $B^4$, encircling both and extending through lugs on the block $B^2$ and set rigid by the nuts $B^5$ on the threaded ends of the yoke. By this construction the vertical distance between the centers of the disks may be varied to increase or diminish the depth of cut of the leading disk.

The scale carried out in the drawings is one-eighth full size. The plow is turning a furrow fourteen inches deep and a proportionate width. The leading disk A' breaks the furrow to a depth of six inches, and the following disk A, set eight inches lower, completes the total depth of fourteen inches. The furrow from the leading disk is delivered into the path of the following disk, which practically acts as the moldboard for both, with the result that the soil from the bottom of the furrow is raised fourteen inches and forms the top of the soil spilled into the furrow of the former cut. The advantages of this deep cut are obvious. The ground is pulverized for a depth of fourteen or more inches, the worn-out surface is buried a like depth, and a new surface is thrown up to the action of the sun.

To throw the second disk A into position to receive the furrow from the leading disk, it is offset to the right. This brings the radial centers of the convexity of the disks about as near together as is possible, the object being to bring the convexity of both disks as nearly in effect as possible to a common curvature. This statement will be elucidated by reference to the double scallop forming the land side of the furrow. (See Fig. 2.) The disks are set at an angle to the line of draft and are tilted back vertically; but this arrangement will be found to vary with size and curvature of the disk. Further, disks of different diameter, curvature, and angle may be combined, and any number of gangs or series may be used in one plow. It is also obvious that said disks can be arranged to throw the soil either to the right or left.

It will be noted that while I have described my improved plow with the forward disk as on a higher plane than the rear disk the same results can be obtained by mounting the deeper disk forward of the other. This modification I have covered in a separate application for patent filed September 29, 1904, Serial No. 226,175.

Having thus described this invention, what is claimed, and desired to be secured by Letters Patent, is—

1. A disk plow comprising a plurality of disks adapted to plow a single furrow, said disks being set one in advance of the other and facing in the same direction.

2. A disk plow comprising a plurality of disks adapted to plow a single furrow, said disks being set one in advance and to one side of the other and facing in the same direction.

3. A disk plow comprising a plurality of disks adapted to plow a single furrow, said disks being set one in advance, above, and to one side of the other, and facing in the same direction.

4. A disk plow comprising a supporting-frame, a plurality of disks supported thereby and adapted to plow a single furrow, said disks being set one in advance of the other and facing in the same direction, and means for varying the relative positions of said disks.

5. A disk plow comprising a supporting-frame, a plurality of disks supported thereby, and adapted to plow a single furrow, said disks being set one in advance and to one side of the other and facing in the same direction, and means for varying the relative positions of said disks.

6. A disk plow comprising a supporting-frame, a plurality of disks supported thereby and adapted to plow a single furrow, said disks being set one in advance, above, and to one side of the other and facing in the same direction, and means for adjusting the forward disk.

In testimony whereof I have hereunto set my hand this 2d day of September, 1903.

GEORGE SPALDING.

Witnesses:
 A. J. HENRY,
 BALDWIN VALE.